(12) United States Patent
McMichael

(10) Patent No.: US 7,527,172 B2
(45) Date of Patent: May 5, 2009

(54) PLURAL COMPONENT MIXING AND DISPENSING APPARATUS

(75) Inventor: Jonathan R. McMichael, Indianapolis, IN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 11/547,460

(22) PCT Filed: Nov. 15, 2004

(86) PCT No.: PCT/US2004/038138

§ 371 (c)(1),
(2), (4) Date: Oct. 4, 2006

(87) PCT Pub. No.: WO2006/054977

PCT Pub. Date: May 26, 2006

(65) Prior Publication Data

US 2007/0170282 A1 Jul. 26, 2007

(51) Int. Cl.
*B67D 5/52* (2006.01)
(52) U.S. Cl. .................. 222/145.5; 239/432; 239/434; 222/135

(58) Field of Classification Search ................. 222/135, 222/145.5, 136, 334, 145.6; 239/414, 432–434
See application file for complete search history.

(56) References Cited

U.S. PATENT DOCUMENTS

| | | | | |
|---|---|---|---|---|
| 1,261,712 | A * | 4/1918 | Crispell | 239/433 |
| 3,437,273 | A * | 4/1969 | Hagfors | 239/414 |
| 3,799,403 | A | 3/1974 | Probst et al. | |
| 4,760,956 | A * | 8/1988 | Mansfield | 239/8 |
| 4,967,956 | A * | 11/1990 | Mansfield | 239/9 |
| 6,796,461 | B1 | 9/2004 | Sinders | |
| 6,811,096 | B2 * | 11/2004 | Frazier et al. | 239/398 |
| 7,021,498 | B2 * | 4/2006 | DiDonato et al. | 222/136 |

* cited by examiner

*Primary Examiner*—J. Casimer Jacyna
(74) *Attorney, Agent, or Firm*—Brinks Hofer Gilson & Lione

(57) ABSTRACT

In an air-operated plural component dispensing hand gun, including a sliding mixing and dispensing element that forms, with a pair of component inlet blocks, the valves controlling the mixing and dispensing of the plural component materials, the mixing and dispensing element includes a rearward part and a forward part which together form a mixing chamber, with admission passages for the plural components to be mixed in the rearward part and a dispensing orifice for mixed plural component material in the forward part, said mixing chamber having an enlarged portion in the rearward part.

15 Claims, 4 Drawing Sheets

PLURAL COMPONENT MIXING AND DISPENSING APPARATUS

FIELD OF THE INVENTION

The present invention relates to apparatus for mixing and dispensing materials, including, for example, an air-operable gun for mixing and dispensing thermoplastic and thermosetting plural component materials, such as urethane foams and coatings, catalyzed polyesters, catalyzed epoxies and other chemical compositions that react rapidly upon mixing of the components thereof.

BACKGROUND OF THE INVENTION

Polyurethane foam systems, for example, usually include component A, an isocyanate, and component B, a preformulated compound comprising a polyether resin, a catalyst, a surfactant and a blowing agent. Each component of the plural material is, by itself, generally stable, that is, each component does not cure or cross-link for several months or more, provided it is properly stored. However, mixing of component A and component B in proper concentrations initiates a chemical reaction that causes the components to begin to polymerize and generate heat which volatilizes the blowing agent and causes the polyurethane to foam, cure and cross-link. In one polyurethane system, water is used to combine with isocyanate to provide a carbon dioxide blowing agent; and in another polyurethane system, a fluorocarbon or Freon, which boils at about room temperature, provides the blowing agent. In this system, the blowing agent is trapped in the resin and acts in cooperation with the other constituents of the system to foam the polyurethane. Other systems may be such that the blowing agent is used to provide a cellular structure.

Usually cross-linking and curing of a plural component material is substantially completed in a matter of seconds. It is therefore desirable to mix the components in the dispensing device as close as is possible to the orifice from which the mix is ejected, that is, mixing of the several components of the compound should take place substantially contemporaneously with dispensing. Mixing the components of the plural component material with the dispensing device requires the apparatus operator to purge the residue of the mixed components from a mixing chamber and the orifice of the dispensing device so that the residue components do not chemically react and clog the chamber and the orifice, or in any other way prevent or inhibit dispensing of the plural component material.

U.S. Pat. No. 3,799,403, issued to Richard O. Probst et al. discloses an apparatus for mixing and dispensing plural component materials, such as urethane foam materials. The Probst et al. patent discloses a hand gun which includes a mixing and dispensing element that is movable with respect to the housing of the device between a rearward position, at which the components of the plural component material are introduced into a mixing chamber in the mixing and dispensing element, appropriately mixed and then dispensed, and a forward position, at which the introduction of components into the mixing chamber is terminated, and air is introduced into the mixing chamber to substantially purge residue material from the mixing chamber and its cooperatively associated orifice.

In the gun disclosed by the Probst et al. patent, the movable mixing and dispensing element forms, in combination with a pair of connection blocks carried by the gun housing, the valves that control the mixing and dispensing of the plural component material. The connection blocks are connectible with the separate pressurized sources of the components of the plural component material and include outlet openings and carry plastic seal members around the outlet openings that interface with and seal against the sides of the mixing and dispensing orifice. The movable mixing and dispensing element includes an internal mixing chamber between its sides, a pair of admission openings, one between each side of the mixing and dispensing element and its internal mixing chamber, and a forward-most dispensing orifice connected with the mixing chamber. When the mixing and dispensing orifice is in its rearward position, the admission openings on each of its sides are aligned with the outlet openings of the connection blocks so the components of the plural component material can flow from their separate pressurized sources into the mixing chamber, where they are mixed and urged out of the dispensing orifice. When the mixing and dispensing element is in its forward position, the outlet openings of the connection blocks are blocked by the sides of the mixing and dispensing element, terminating the dispensation of mixed plural component materials. In the rearward position, the seals carried by the connection blocks confine the flows of the plural components to between the connection block-outlet openings and the admission openings of the mixing and dispensing element, and in the forward position, the seals prevent the plural components from flowing into the interface between the mixing and dispensing element and the connection blocks.

The housing of the device disclosed by the Probst et al. patent includes an air-operated piston/cylinder that is connected to the mixing and dispensing element to move it between its forward and rearward positions. A trigger on the handle of the hand gun controls the application of compressed air, through a four-way valve, to the portions of the cylinder on each side of a piston to move it forwardly and rearwardly within the cylinder, thus moving the mixing and dispensing element between its rearward mixing and dispensing position and its forward position at which the flow of plural component material is terminated and the mixing chamber is purged.

Plural component guns like those disclosed in the Probst et al. patent have been sold for almost 30 years by Glas-Craft, Inc., with the registered trademark PROBLER®.

More recently, such guns have incorporated an improved air actuator for controlling the flow of plural component material from the gun, as disclosed in U.S. Pat. No. 6,796,461 issued to Steven Sinders. In the improved air actuator, two serially connected pistons operating along a common axis within two separate cylinder portions of the housing drive the mixing and dispensing element back and forth along the common axis by the application of compressed air to the two separate cylinder portions of the housing.

Nevertheless, in such guns, it has been difficult to obtain consistently effective mixing of the plural component materials and wide and uniform spray patterns of the mixed plural component materials with the mixing and dispensing element of the apparatus.

BRIEF SUMMARY OF THE INVENTION

The invention provides a plural component apparatus in which plural component materials can be consistently and effectively mixed and dispensed in a consistently wide and uniform spray pattern by a mixing and dispensing element that may be more reliably and consistently manufactured and that effectively mixes the plural components of the material and uniformly dispenses the mixed plural component material in a wide, uniform and usable spray pattern.

In the invention, the mixing and dispensing element is provided with a mixing chamber having a rearward portion into which the plural components are admitted that is larger than the dispensing orifice at its forward end, and the mixing and dispensing element preferably includes a forward part with the dispensing orifice and a rearward part, with the mixing chamber extending through the forward and rearward parts of the mixing and dispensing element and with the larger rearward portion of the mixing chamber in the rearward part of the mixing and dispensing element.

This invention provides an apparatus for mixing the plural components of a plural component material and for dispensing the mixed plural component material that includes: a housing including a connection portion at its forward end; a mixing and dispensing element having a rearward part with opposed planar side portions, a forward part with a dispensing orifice, and a mixing chamber formed within the forward and rearward parts leading to the dispensing orifice, the rearward part of the mixing and dispensing element including a pair of passages for admission of the plural components into the mixing chamber, with one admission passage extending from one of the opposed planar sides and the other admission passage extending from the other of the opposed planar sides and with the rearward portion of mixing chamber in the rearward part of the mixing and dispensing element having a greater diameter than the diameters of the admission passages, said mixing and dispensing element being slidably carried by the connection portion of the housing and combining with the connection portion of the housing to form valves controlling the flow of the plural components through the admission passages, the mixing chamber and dispensing orifice; and an actuator for sliding the mixing and dispensing element between a first position blocking flow of the plural components into the mixing chamber and a second position allowing the plural components to flow into the mixing chamber for mixing and dispensation from the dispensing orifice.

The drawings and more detailed description of the preferred embodiment that follow comprises one example of the invention. Other embodiments of the invention will be apparent to those skilled in the art from the drawings and more detailed description that follows.

BRIEF DESCRIPTIONS OF THE DRAWINGS

Figure 1:
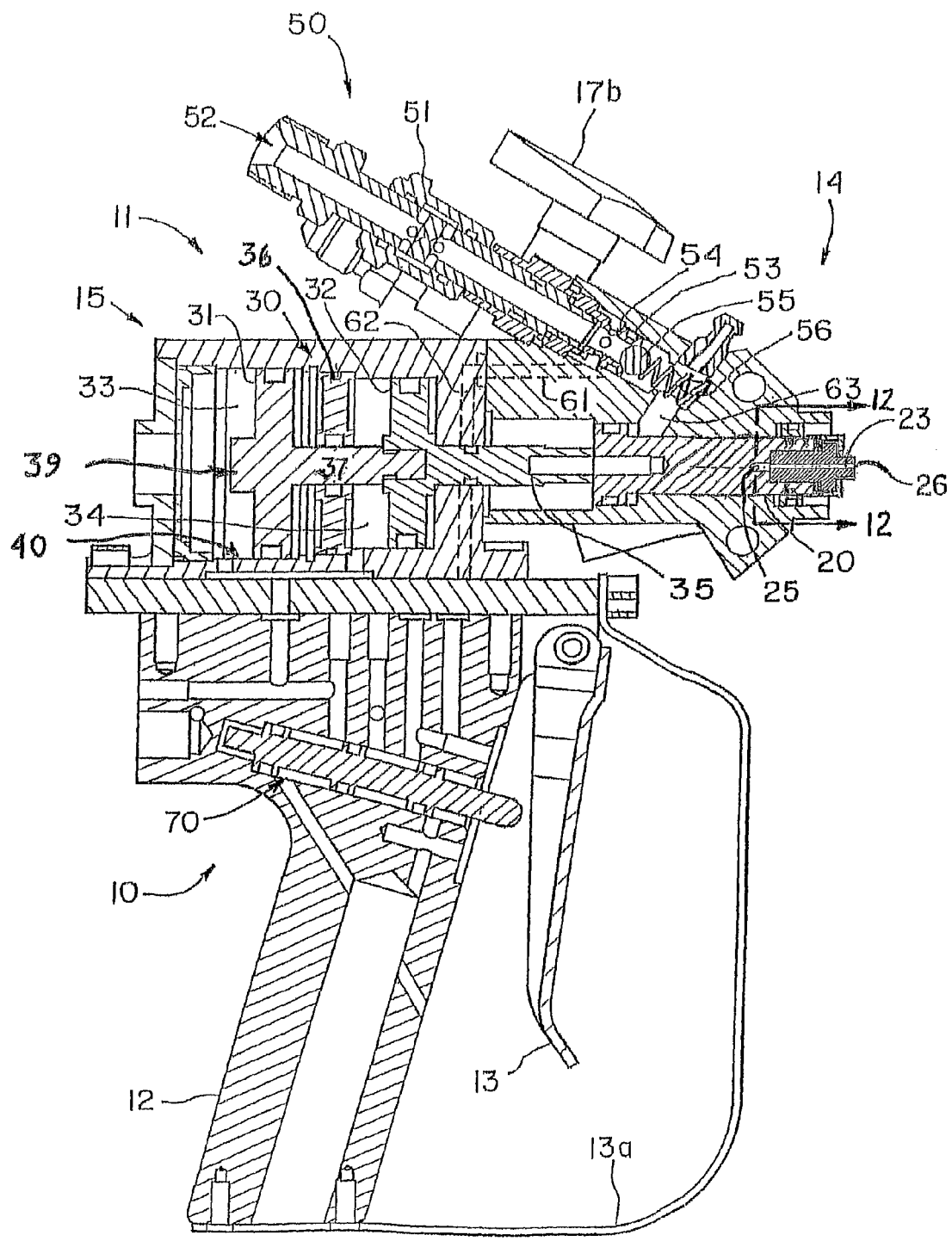
FIG. 1 is a cross-sectional view of a plural component hand gun of the invention, taken at the vertical plane and in the direction indicated by line 1-1 of FIG. 2, in the non-dispensing position.
Figure 3:
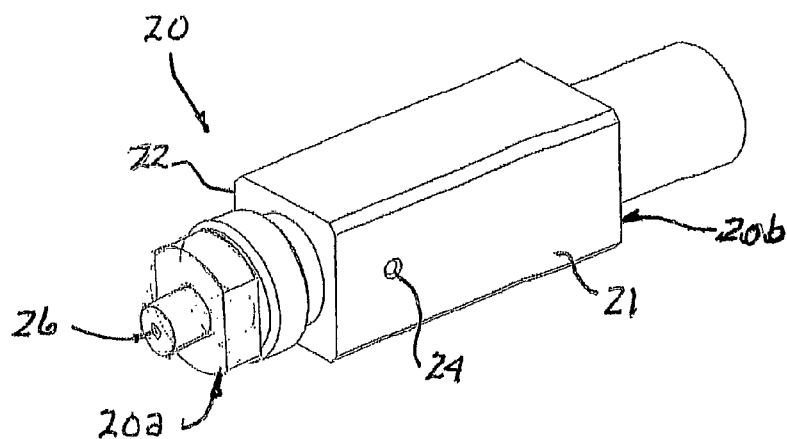
FIG. 3 is a perspective view of a preferred mixing and dispensing element of the plural component handgun of FIGS. 1 and 2.
Figure 4:
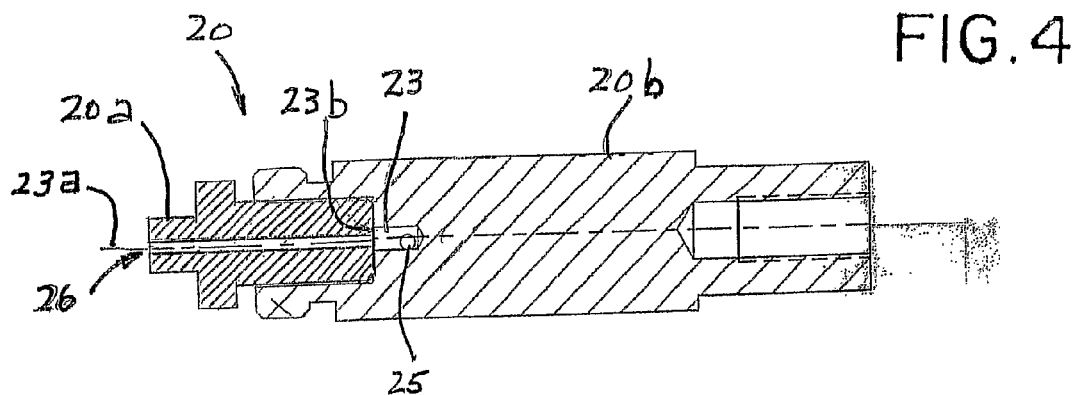
FIG. 4 is a cross-sectional view of the preferred mixing and dispensing element of FIG. 3, taken at a vertical plane through the center of the mixing and dispensing element.
Figure 12:
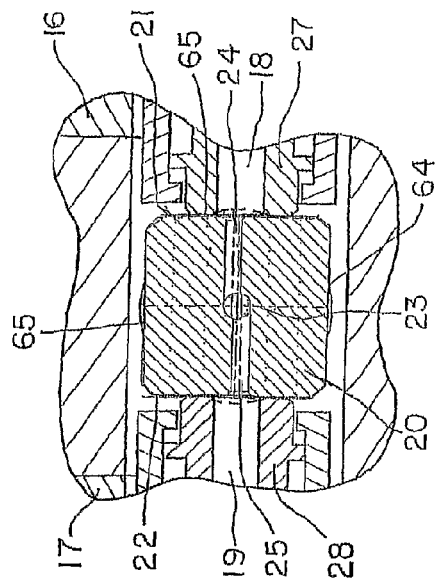
Figure 11:
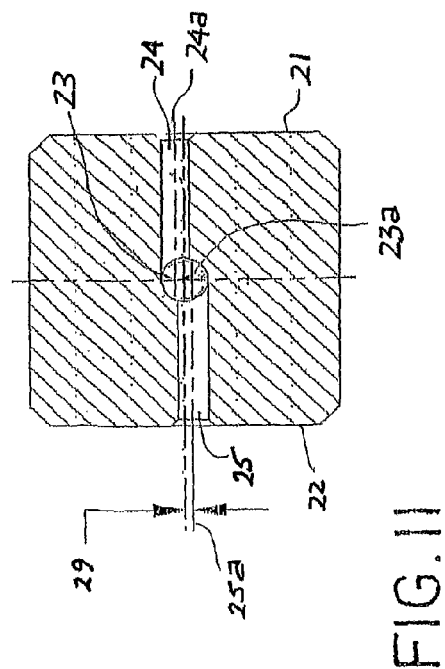
Figure 10:
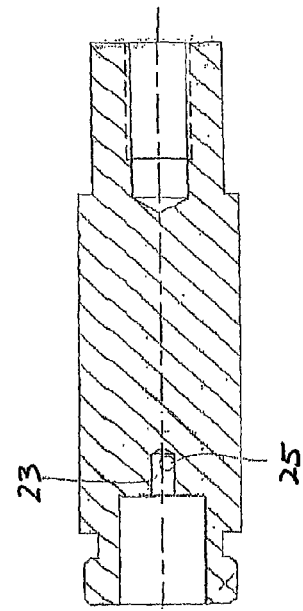
FIG. 10 is a cross-sectional view of the rearward part of the preferred mixing and dispensing element of FIGS. 3 and 4 taken at a plane indicated by line 10-10 of FIG. 9.
Figure 9:
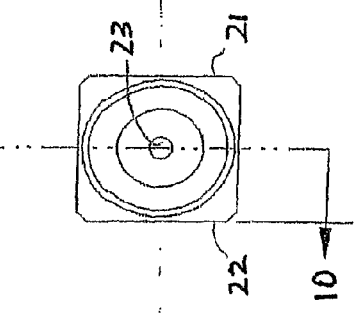
FIG. 9 is a front view of the rearward part of the preferred mixing and dispensing element of FIGS. 3 and 4.
Figure 8:
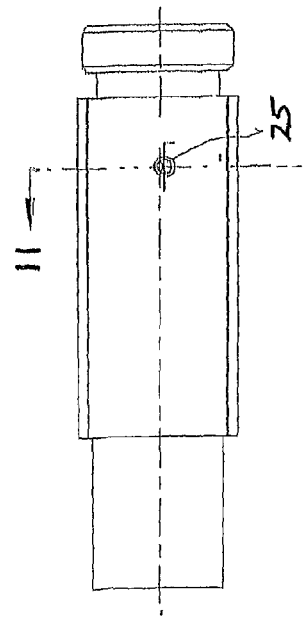
FIG. 8 is a side view of the rearward part of the preferred mixing and dispensing element of FIGS. 3 and 4.

FIG. 11 is a cross-sectional view of the rearward part of the preferred mixing and dispensing element of FIGS. 3 and 4 taken at a plane indicated by line 11-11 of FIG. 8; and FIG. 12 is an enlarged partial cross-sectional view of FIG. 1 taken at the vertical plane and in the direction indicated by line 12-12 of FIG. 1 to illustrate the sealed interface between the mixing and dispensing element and its connection blocks in the mixing and dispensing position.

DETAILED DESCRIPTION OF THE CURRENTLY BEST KNOWN MODE OF THE INVENTION

Figure 2:
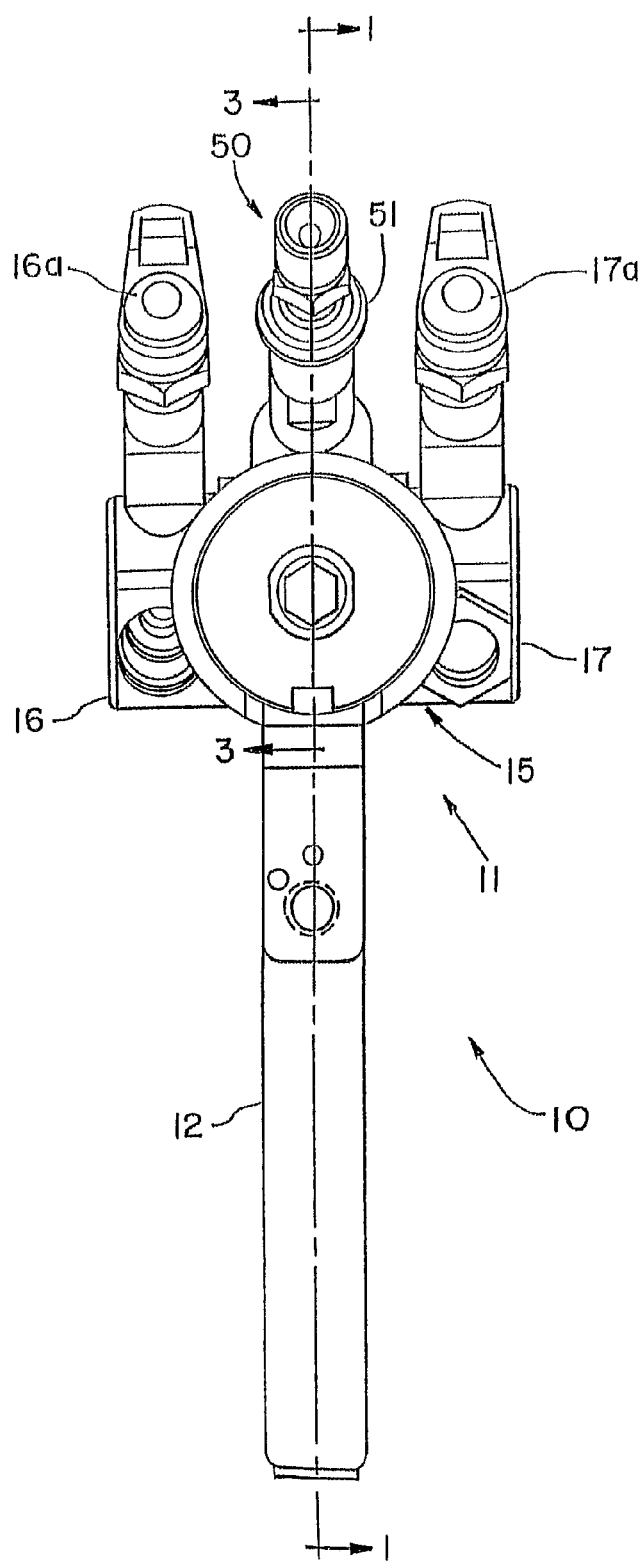
FIG. 2 is a view of the plural component hand gun of FIG. 1, taken from the rear.

FIGS. 1-12 exemplify one preferred plural component dispensing hand gun 10 of the invention. As indicated by FIG. 1, the plural component dispensing hand gun 10 includes a housing 11, a handle 12 extending from the housing at an angle, and a trigger 13 pivotally carried by the handle 12. The hand gun 10 may be conveniently provided with a trigger guard 13a. The housing 11 includes a connection portion 14 at its forward end and an actuator portion 15 at its rearward end. The words "forward" and "forwardly" in this description refer to the direction in which mixed plural component material is dispensed, and the terms "rearward" and "rearwardly" refer to the direction toward the back of the gun, which is illustrated in FIG. 2.

The connection portion of the housing 14 carries a pair of connection blocks 16 and 17 (see FIG. 2). The connection blocks 16 and 17 provide connections for hoses that lead from the apparatus 10 to pressurized sources of each of the components of the plural component material. For example, connection block 16 carries a hose connection 16a for a flexible hose leading to a source of component A of a plural component material, and connection block 17 carries a hose connection 17a for a flexible hose leading to a source of component B of the plural component material. The connection blocks 16 and 17 can also carry valves 17b and 16b (not shown) to block the flow of the plural components to the outlets 18, 19 (FIG. 12) of the connection blocks. The connection blocks 16 and 17 thus provide the inlets for each of the components of the plural component material to the hand gun 10, and are also sometimes referred to in this description as inlet blocks 16 and 17.

In the hand gun 10, the hose connections 16a and 17a project upwardly and rearwardly from the connection blocks 16 and 17 so the hoses supplying the plural components from their respective separate sources of supply will be conveniently carried by the hand gun 10 over the handle 12. The hand gun 10 is likewise connected with a source of compressed air by an air inlet means 50 of the invention, described in greater detail below. As illustrated by FIGS. 1 and 2, the air inlet means 50 also projects upwardly and rearwardly from the connection portion 14 of the housing so that an air hose connected thereto will be conveniently carried over the handle 12 of the gun. The air inlet means 50 can include a sliding on/off valve 51 so that the hand gun operator can remove air pressure from the gun when it is not in operation. With valve 51 turned off, the gun 10 cannot be operated. The on/off valve can also be used to control the flow of compressed air used to purge the mixing chamber 23 when the gun is in the non-dispensing position.

As best illustrated in FIG. 1, the connection portion 14 of the housing slidably carries a mixing and dispensing element 20, and the actuator portion 15 of the housing 11 carries air actuator 30 to move the mixing and dispensing element 20 forwardly and rearwardly within the connection portion 14 of the housing.

FIGS. 3-11 illustrate a preferred mixing and dispensing element 20 of the invention. As illustrated by FIGS. 3, 9, 11 and 12, the mixing and dispensing element 20 is formed with a pair of planar sides 21 and 22, an internal mixing chamber 23 located between the planar sides 21 and 22, and a pair of admission passages 24 and 25, with admission passage 24 extending between planar sidewall 21 and the mixing chamber 23, and with admission passage 25 extending between planar sidewall 22 and the mixing chamber 23.

In the preferred mixing and dispensing element 20 of the invention, the mixing chamber 20 is formed with a cylindrical sidewall, for example, by a drilling operation, and the admission passages 24 and 25 are also preferably formed with cylindrical sidewalls, preferably by a drilling operation. It is important in the achievement of effective mixing and dispensation of the plural components of the material that the cylindrical sidewalls of the admission passages 24 and 25 are tangent to the cylindrical sidewall of the mixing chamber 23 where they intersect. To reliably achieve the desired tangency of the cylindrical sidewalls of the admission passages 24 and 25 and the mixing chamber 23, the diameter of the cylindrical sidewall of the mixing chamber 23, where it is intersected by the admission passages 24, 25, should be about 1.6 times or more the diameter of the admission passage 24 and 25. With the diameter of the cylindrical mixing chamber 23 about 1.6 times the diameters of the admission passages 24 and 25, the drill used to form the mixing chamber provides the mixing chamber with a central axis 23$a$ that remains more concentric with its intended central axis and provides effective offsets 29 (see FIG. 11) between the central axes 24$a$, 25$a$ of the admission passages 24, 25 and the central axis 23$a$ of the mixing chamber 23. With the cylindrical sidewalls of admission passages 24 and 25 tangent to the cylindrical sidewall of the mixing chamber 23, each of the plural component materials flowing through the admission passages 24 and 25 flows smoothly from the admission passages 24 and 25 into the mixing chamber 23 with minimal turbulence, and the plural component materials are effectively mixed by the swirling action imposed on the flows by the cylindrical sidewall of the mixing chamber and the offsets 29 of the admission passages 24 and 25, about 0.011 to about 0.013 inches. In the preferred mixing and dispensing element 20, the diameters of admission passages 24 and 25 are preferably equal, and the cross-sectional area of the dispensing orifice 26 is preferably equal to the sum of the cross-sectional areas of the admission passages 24 and 25. For example, in one preferred apparatus of the invention, the diameter of the admission passages 24, 25 is about 0.043 inches, the diameter of the mixing chamber 23, where the admission passages 24, 25 intersect the mixing chamber, is about 0.069 inches, the diameter of the dispensing orifice 26 is preferably about 0.060 inches, and the offset 29 is about 0.011 inches.

Figures 5, 6, 7:
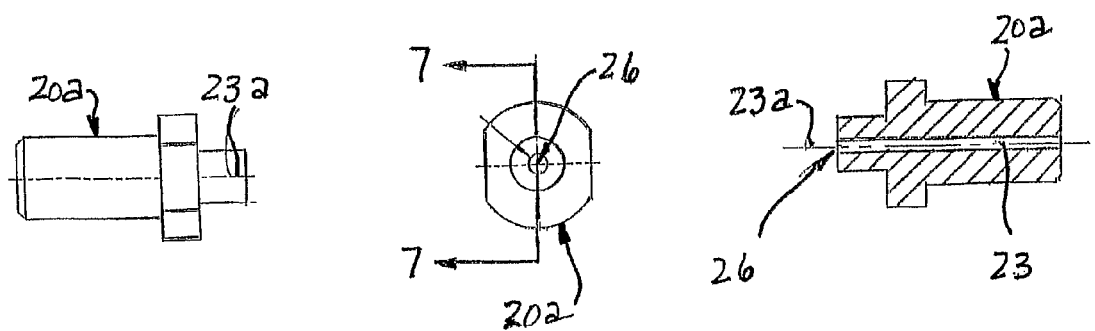
FIG. 5 is a side view of the forward part of the preferred mixing and dispensing element of FIGS. 3 and 4.
FIG. 6 is a front view of the forward part of the preferred mixing and dispensing element of FIGS. 3 and 4.
FIG. 7 is a cross-sectional view of the forward part of the preferred mixing and dispensing element of FIGS. 3 and 4 taken at a plane indicated by line 7-7 of FIG. 6.

As illustrated, for example, in FIGS. 3 and 4, a preferred mixing and dispensing element 20 comprises a forward element 20$a$ and a rearward element 20$b$. The forward part 20$a$ of the mixing and dispensing element 20 is illustrated in FIGS. 5-7, and the rearward part 20$b$ of the mixing and dispensing element is illustrated in FIGS. 8-11. The admission passages 24 and 25 are formed in the rearward part 20$b$ of the mixing and dispensing element 20, and the mixing chamber 23 extends from the admission passages 24, 25 forwardly through both the rearward part 20$b$ and the forward part 20$a$, with the portion of the mixing chamber 23 that lies within the rearward part 20$b$ having a preferable diameter about 1.6 times, or more, the diameter of the admission passages 24, 25. The diameter of the mixing chamber that lies within the forward part 20$a$ of the mixing and dispensing element has the same diameter as the dispensing orifice 26, as shown in FIG. 7, which is preferably about 1.4 times the diameter of the admission openings 24, 25. Thus, in the preferred mixing and dispensing element 20, the preferred two-part construction results in a discontinuity 23$b$ in the mixing chamber 23 (see FIG. 4), which creates turbulence that assists mixing the plural components together without adversely affecting the desired uniformity of the spray pattern formed as the mixed plural component material is dispensed from the dispensing orifice 26. The manufacturing of the mixing and dispensing element 20 is made substantially more reliable and consistent with its preferred two-part construction because the portion of the mixing chamber 23 in the rearward part 20$b$ of the mixing and dispensing element is substantially shorter, further avoiding the departure of the central axis 23$a$ of the mixing chamber 23 from concentricity with its intended position and permitting tangency of the sidewalls of the mixing chamber 23 and admission passage 24, 25.

As illustrated by FIG. 12, the connection or inlet blocks 16 or 17 include outlet openings 18 and 19, respectively, that are at the terminal ends of liquid passageways extending through the connection or inlet blocks 16 or 17, respectively, from their respective hose connections 16$a$ and 17$a$. A pair of seal elements 27, 28 is carried by the connection blocks 16 and 17 around their outlet openings 18 and 19, respectively, to seal the interfaces between the planar sides 21 and 22 of the mixing and dispensing element 20 and the adjoining side surfaces of the connection/inlet blocks 16 and 17.

When the air actuator 30 moves the mixing and dispensing element 20 rearwardly, it comes to rest in a dispensing position in which the admission openings 24, 25 of the mixing and dispensing element 20 are aligned with the outlets 18, 19 of the connection blocks 16, 17, illustrated by FIG. 12, and the pressurized sources of the components of the plural component material can urge the components of the plural component material, which are connected to the hose connections 16$a$ and 17$a$, through the admission openings 24 and 25 into the mixing chamber 23 for mixing and dispensation from the dispensing orifice 26 of the mixing and dispensing element 20. When the air actuator 30 moves the mixing and dispensing element 20 forwardly within the connection portion 14 of the housing 11, the admission openings 24, 25 of the mixing and dispensing element 20 are moved out of alignment with the outlet openings 18, 19 of the connection blocks 16, 17, and the planar sides 21, 22 of the mixing and dispensing element 20 block the outlet openings 18, 19, which are sealed shut by the planar sides 21, 22 of the mixing and dispensing element 20 and the seal elements 27, 28. Thus, the mixing and dispensing element 20 not only provides a means for mixing and dispensing plural component materials, it also provides a valve means for controlling their flow from the hand gun 10.

Compressed air delivered to the gun through the air inlet means 50 is put into a plurality of uses in the gun 10. When the valve 51 is in the "on" position, compressed air applied to the inlet end 52 of the air inlet means 50 is present at a first opening 53 downstream of the on/off valve 51, and can flow through air passageways 61 and 62 formed respectively in the connection portion 14 and actuator portion 15 of the housing 11 for connection with air passageways in the handle 12, and for control by a three-way valve 70, which is operated by the trigger 13 pivotally connected with the handle. When the trigger 13 is in the unpulled position, the chambers of the three-way valve 70 connect compressed air from passageway 62 to the air actuator 30 to force the mixing and dispensing element 20 forwardly to the non-dispensing position illustrated in FIG. 1, and when the trigger is pulled rearwardly by an apparatus operator, the chambers of the three-way valve apply compressed air to the air actuator 30 to move the mixing and dispensing element 20 to its rearward dispensing position illustrated in FIG. 12. The passageways leading from the three-way valve through the handle 12 and the actuator portion 15 of the housing to the air actuator 30 are not shown but will be apparent to those skilled in the art from the description of the air actuator.

The use of metal seal elements 27, 28, preferably hardened stainless steel, greatly reduces the wear on the seal elements, the possibility of a seal failure, and substantially increases the time between replacement of the seal elements, reducing the maintenance costs of the hand gun 10. Unfortunately, the use of metal seal elements 27, 28 substantially increases the force needed to slide the mixing and dispensing element 20 between its dispensing and non-dispensing positions. The use of metal seals almost doubles the force needed to slide the mixing and dispensing element 20 between its dispensing and non-dispensing positions in operation of the hand gun, and would, unfortunately require the actuator portion of the housing to almost double in size in order for the pressure of compressed air that is usually available in a manufacturing operation to develop sufficient force to reliably move the mixing and dispensing element 20 between its dispensing and non-dispensing positions. Such an increase in size and the accompanying increase in weight would undesirably reduce the maneuverability of the hand gun and result in increased fatigue of hand gun operators.

As illustrated by FIG. 1, the hand gun 10 of the invention does not include an actuator portion of the housing having increased size and weight, because the air actuator comprises to serially connected pistons 31, 32 operating along a common axis within two separate cylinder portions 33, 34 of the housing 11. The serially connected pistons 31, 32 are connected to the mixing and dispensing element 20 by a rod 35, extending forwardly through the actuator portion 15 of the housing with which it is sealed. In the operation of the hand gun 10, the two serially connected pistons 31, 32 are driven in the same direction along a common axis by the application of compressed air to the two separate cylinder portions 33, 34, as a result of the operation of trigger 13 and three-way valve 70. When the trigger 13 is in the unpulled position, the three-way valve 70 applies compressed air within the two separate cylinder portions 33, 34 rearwardly of the pistons 31, 32, moving the mixing and dispensing element 20 to its non-dispensing position illustrated in FIG. 1. When the trigger 13 is pulled, it moves the three-way valve 70 to a position in which compressed air is applied to the two separate cylinder portions 33, 34 forwardly of the pistons 31, 32 to move the pistons 31, 32 rearwardly within their separate cylinder portions 33, 34, and to move the mixing and dispensing element 20 rearwardly to its dispensing position, as illustrated in FIG. 12. Thus, the force generated by the air actuator and applied to the mixing and dispensing element 20 can be substantially doubled by the forces exerted on the two serially connected pistons by the compressed air, thus obviating the need to increase the size and weight of the hand gun 10 to overcome the substantial friction imposed on the gun by the metal seals 27, 28.

In the preferred embodiment of the hand gun 10, illustrated in the figures, and particularly in FIG. 1, the actuator portion 15 is provided with a cylinder-forming wall 40 that has a smaller diameter forward portion, and a larger diameter rearward portion. A dual piston element 39 is slidably carried within the cylinder-forming walls, and extends forwardly through rod 35 for connection with the mixing and dispensing element 20. The dual piston element 39 comprises an assembly including a forward piston 32 and a rearward piston 31, which may be slidably sealed with the smaller diameter forward portion, and the larger diameter rearward portion, respectively, of the cylinder-forming wall 40, and a cylinder-dividing element 36 is slidably carried by a connecting rod 37 extending between the forward and rearward pistons 32 and 31. With the dual piston element 39 in place within the large and smaller cylinder-forming walls, the cylinder-dividing element 36 is sealed with the larger diameter portion of the cylinder-forming wall, and is seated and held stationary at the wall formed by the transition between the smaller diameter portion and larger diameter portion of the cylinder-forming wall 40. As a result, the actuator portion 15 and the cavity formed by the cylinder-forming wall 40 is divided into the first cylinder portion 34 with the forward piston 32 being drivable therein, and a second cylinder portion 33 with the rearward piston 31 being drivable therein, and the driving forces generated on the pistons 31, 32 by the compressed air are added in sliding the mixing and dispensing element 20 between its forward and rearward positions. For example, in a preferred hand gun of the invention, the smaller diameter cylinder has a diameter of 1⅜ inches, and a larger diameter cylinder has a diameter of 1½ inches, providing a combined area upon which compressed air acts equal to almost 3¼ square inches, permitting factory air to exert several hundred pounds of force to move the mixing and dispensing element 20 between its dispensing and non-dispensing positions.

As noted earlier, compressed air admitted to the inlet end of 52 of the air inlet means 50 is put to a plurality of uses in the gun. In addition to operation of the two serially connected pistons 31, 32, as a result of operation of the trigger 13 and the three-way valve 70, compressed air is also directed from the air inlet means 50 through passageways including passageway 63, formed in the connection portion 14 of the housing 11, to an air chamber 64 (shown in FIG. 12) formed by a cylindrical cavity portion 65 within the actuator portion 14 of the housing 11 in communication with the sides 21, 22 of the mixing and dispensing element 20, which has a square cross-section in the preferred embodiment. When the mixing and dispensing element 20 is in its forward non-dispensing position, the admission openings 24, 25 of the mixing and dispensing element 20 are moved from within seal elements 27, 28 and are located within the air chamber 64 so that compressed air applied to the air chamber 64 will be forced through the admission openings 24, 25, the mixing chamber 23, and the dispensing orifice 26, expelling residue of the plural component material therefrom so it does not cure and prevent or inhibit further operation of the gun 10. The flow of purging air through passageway 63, the air chamber 64 formed in connection portion 14 of the housing, the admission openings 24, 25 and the mixing chamber 23 and dispensing orifice 26 may be controlled by adjustment of the on/off valve 51, or other valve between the end of the air inlet means 50 and passageway 63.

As shown in FIG. 1, the air inlet means 50 is threadedly connected to an air inlet passage 54, formed in the connection portion 14 of the housing 11. The air inlet 54 and the connection portion 14 of the housing carry a ball check valve formed by a ball 55 and a spring 56 that urges the ball 55 into a sealing position against the end of the air inlet means 50 if compressed air is not present at the first opening 53 of the air inlet means 50. The ball check valve formed by ball 55, spring 56 and the end of the air inlet means 50 is in the closed position when compressed air is not present at the first orifice 53, and thus prevents plural component material from flowing backwardly through the passageway 63 into the passageways 61, 62 and into the three-way valve 70 and air actuator 30 in the event the seals 27, 28 between the mixing and dispensing element 20 and the connection blocks 16 and 17 fail, or in the event the connection blocks 16 and 17 are not properly seated or have become defective.

As known in the art, the components of the gun 10 are fabricated from any suitable wear-resistant material that is chemically inert with respect to the components of plural component materials being dispensed. Suitable materials include aluminum, aluminum alloys, steel, and strong, durable plastics, such as acetyl resin, glass-filled epoxy, glass-filled nylon and the like, the preferable materials being light-weight metals, such as aluminum.

Thus, preferred embodiments of the gun 10 can include air inlet means 50 for connecting a source of compressed air with compressed air inlet 54 that is formed in the connection portion 14 of the housing 11, and the compressed air inlet means can comprise a manually operated off/on valve 51 between the source of compressed air and the compressed air inlet 54, a first opening 53 in communication with air passageways 61, 62 leading to a three-way valve 70 and an air actuator 30, and a second opening 63 in communication with an air chamber formed in the connection portion 14 of the housing for the passage of compressed air to expel mixed plural component material residue from the mixing chamber 23 of the mixing and dispensing element 20. In the air inlet means 50, a ball check valve is provided between the first and second openings 53, 63, which is opened in the presence of compressed air at the first opening 53, and closed in the absence of compressed air at the first opening 53, thereby preventing plural component air from flowing back into the first opening 53 and the air passageways 61, 62 leading to the three-way valve 70 and the air operated actuators 30.

The foregoing detailed description and the drawings should be regarded as illustrative rather than limiting, and it should be understood that it is the following claims, including all equivalents, that are intended to define the spirit and scope of this invention.

The invention claimed is:

1. In an apparatus for mixing the plural components of a plural component material and dispensing the mixed plural component material, including
    a housing including a connection portion at its forward end and an actuator portion at its rearward end;
    a mixing and dispensing element formed with opposed planar side portions, an unobstructed air purge-able cylindrical mixing chamber within the element between the planar side portions, a pair of cylindrical admission passages, with one cylindrical admission passage extending between each of the planar side portions and the mixing chamber, and a dispensing orifice in communication with the mixing chamber at the forward end of the mixing and dispensing element, said mixing and dispensing element being slidably carried by the connection portion of the housing;
    a connection block for each of the plural components carried by the connection portion of the housing, one connection block being carried on each side of the connection portion of the housing with a side surface interfacing with a planar side portion of the mixing and dispensing element, each connection block providing means for connecting a supply of one of the plural components with the mixing chamber of the mixing and dispensing element and including an internal supply passageway leading to an outlet opening in its side surface, the side surface of each of said connection blocks carrying a seal element around its outlet opening that slidably engages the interfacing planar side portion of the mixing and dispensing element and seals the interface between the connection block and the mixing and dispensing element; and
    an air-operated actuator carried by the actuator portion of the housing for sliding the mixing and dispensing element with respect to the connection portion of the housing between a rearward position at which the admission openings of the mixing and dispensing element communicate with the outlet openings of the connection blocks, permitting a flow of the plural components into the mixing chamber for mixing and dispensation, and a forward position at which the outlet openings of the connection blocks are blocked by the planar side portions of the mixing and dispensing element and the admission openings are located to provide a purging flow of air through the mixing chamber and dispensing orifice;
    the improvement wherein said mixing and dispensing element comprises two parts with said dispensing orifice being formed in a forward part and said cylindrical admission passages being formed in a rearward part and with the unobstructed air purge-able cylindrical mixing chamber extending forwardly from the admission passages through the two parts to the dispensing orifice, each of the admission passages having a cylindrical sidewall with a lesser diameter than the cylindrical sidewall of the mixing chamber, and each of the cylindrical sidewalls of the admission passages crossing and being tangent to the cylindrical sidewall of the mixing chamber at its intersection with the cylindrical sidewall of the mixing chamber, the sum of the cross-sectional areas of the cylindrical admission passages being substantially equal to the cross-sectional area of the dispensing orifice.

2. The apparatus of claim 1 wherein the diameter of the cylindrical sidewall of the mixing chamber is about 1.6 times the diameters of the admission passages at their intersections.

3. The apparatus of claim 1 wherein the central axes of the cylindrical sidewalls of the admission passages are each offset from the central axis of the cylindrical sidewall of the mixing chamber by at least about 0.011 to about 0.013 inches.

4. The apparatus of claim 1 wherein the diameter of the cylindrical sidewall of the mixing chamber is greater in the rearward part than in the forward part.

5. The apparatus of claim 4 wherein the diameter of the cylindrical sidewall in the rearward part is about 1.13 times the diameter of the dispensing orifice.

6. The apparatus of claim 1 wherein the length of the mixing chamber in the forward part is about four to about five times longer than the length of the mixing chamber in the rearward part.

7. In an apparatus for mixing the plural components of a plural component material and spraying the mixed plural component material, including
    a housing including a connection portion at its forward end and an actuator portion at its rearward end;
    a mixing and spraying element being formed with opposed planar side portions, a mixing chamber including an unobstructed air purge-able passageway with a cylindrical sidewall within the mixing and spraying element between the planar side portions, a pair of admission passages with one admission passage extending between each of the planar side portions and the mixing chamber, each admission passage having a cylindrical sidewall of the substantially the same diameter, and a spraying orifice in communication with the mixing chamber at the forward end of the mixing and spraying element, said mixing and spraying element being slidably carried by the connection portion of the housing;

a connection block for each of the plural components carried by the connection portion of the housing, one connection block being carried on each side of the connection portion of the housing with a side surface interfacing with a planar side portion of the mixing and spraying element, each connection block providing means for connecting a supply of one of the plural components with the mixing chamber of the mixing and spraying element and including an internal supply passageway leading to an outlet opening in its side surface, the side surface of each of said connection blocks carrying a seal element around its outlet opening that slidably engages the interfacing planar side portion of the mixing and spraying element and seals the interface between the connection block and the mixing and spraying element; and an air-operated actuator carried by the actuator portion of the housing for sliding the mixing and spraying element with respect to the connection portion of the housing between a rearward position at which the admission openings of the mixing and spraying element communicate with the outlet openings of the connection blocks, permitting a flow of the plural components into the mixing chamber for mixing and spraying, and a forward position at which the outlet openings of the connection blocks are blocked by the planar side portions of the mixing and spraying element and the admission openings are located in an air chamber to provide a purging flow of air through the mixing chamber and spraying orifice;

the improvement wherein the mixing chamber includes a rearward portion adjacent the admission passages with a diameter that is at least about 1.6 times the diameter of the admission passages and a forward portion, of lesser diameter than the rearward portion, forming the spraying orifice, the spraying orifice having a cross-sectional area about equal to the sum of the cross-sectional areas of the admission passages, the admission passages being each offset from the central axis of the cylindrical sidewall of the mixing chamber about 0.011 to about 0.013 inches with their cylindrical sidewalls tangent to the cylindrical sidewall of the mixing chamber at their intersections with the cylindrical sidewall of the rearward portion of the mixing chamber.

8. The apparatus of claim 7 wherein the rearward portion of the mixing chamber is about 16 percent to about 20 percent of the total length of the mixing chamber and has a diameter about 1.13 times the diameter of the dispensing orifice.

9. The apparatus of claim 7 wherein the mixing and dispensing element comprises a forward part having the dispensing orifice and a rearward part comprising the rearward portion of the mixing chamber.

10. A mixing and spraying element for a plural component spraying apparatus, comprising:

a two-part assembly having a forward part and a rearward part and forming an unobstructed cylindrical internal mixing chamber to provide mixing and spraying of the mixed plural components, said rearward part having planar and opposed outer side portions and forming a rearward internal mixing chamber portion including an unobstructed central passageway with a cylindrical side wall extending to its forward end, said rearward part also having at least two admission passages having cylindrical side walls, with each admission passage extending between each of the planar and opposed outer side portions and the unobstructed central passageway and with its cylindrical sidewall being tangent to the cylindrical sidewall of the rearward internal mixing chamber portion, said cylindrical sidewall of the rearward internal mixing chamber portion having a diameter greater than the diameters of the cylindrical side walls of the admission openings, said rearward part being adapted at its forward end to accept the insertion of the forward part, said forward part forming a forward internal mixing chamber portion including an unobstructed central passageway with a cylindrical sidewall forming a spraying orifice at its forward termination, said forward part being adapted at its rear for insertion and joining with the rearward part, the unobstructed central passageway of the forward part being located for open communication with the unobstructed central passageway of the rearward part when inserted and joined with the rearward part, the cylindrical sidewall of the unobstructed central passageway of the rearward part having a larger diameter than the unobstructed central passageway of the forward part, the sum of the cross-sectional areas of the cylindrical admission passages being substantially equal to the cross sectional area of the spraying orifice.

11. The mixing and spraying element of claim 10 wherein the diameter of the cylindrical sidewall of the rearward internal mixing chamber portion of the mixing chamber is about 1.6 times the diameter of the cylindrical side walls of the admission passages at their intersections.

12. The mixing and spraying element of claim 10 wherein the central axes of the cylindrical sidewalls of the admission passages are each offset from the central axis of the cylindrical sidewall of the rearward internal mixing chamber portion of the mixing chamber by at least about 0.011 to about 0.013 inches.

13. The mixing and spraying element of claim 10 wherein the length of the forward internal mixing chamber portion in the forward portion is about four to about five times longer than the length of the rearward internal mixing chamber portion in the rearward portion.

14. The mixing and spraying element of claim 10 wherein the diameter of the cylindrical sidewall of the unobstructed central passageway in the rearward part is about 1.13 times the diameter of the spraying orifice in the forward part.

15. The mixing and spraying element of claim 10, wherein the diameters of the admission passages are about 0.043 inches, the diameter of the internal mixing chamber in the rearward part is about 0.069 inches, each of the admission passages is offset from the central axis of the mixing chamber in the rearward part about 0.011 inches, and the diameter of the spraying orifice is about 0.060 inches.

* * * * *